Figure 1:
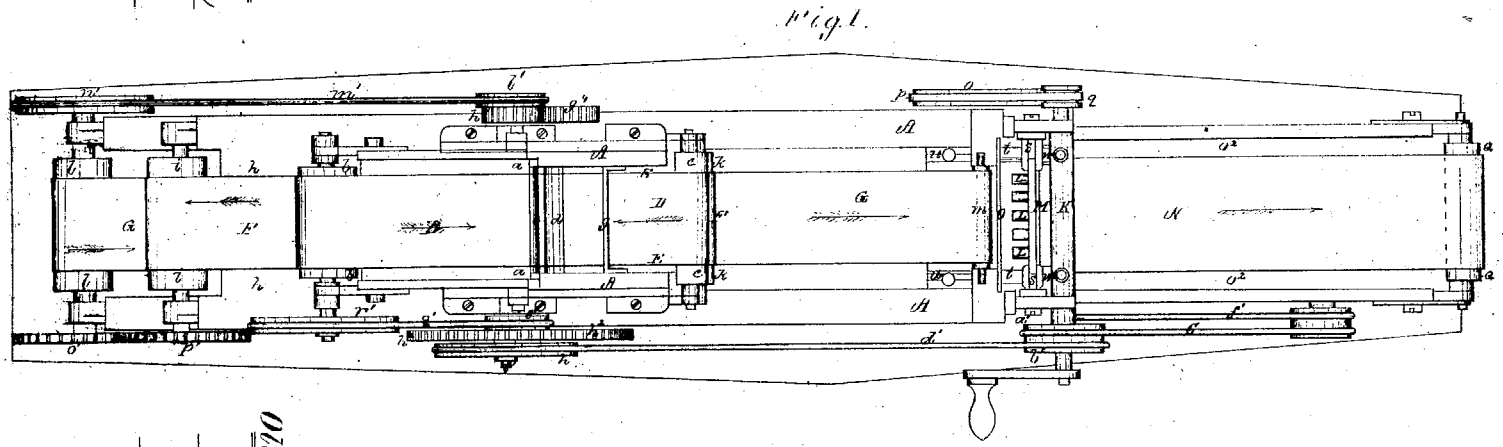

4 Sheets--Sheet 1.

OLIVER RICE CHASE.

Improvement in Machine for Manufacturing Lozenges.

Reissued Nov. 14, 1871.

No. 4,634.

Witnesses.

Saml. Gould

F. L. Hale.

Oliver Rice Chase by his attorney,

J. P. Hale

OLIVER RICE CHASE.
Improvement in Machine for Manufacturing Lozenges.
No. 4,634. Reissued Nov. 14, 1871.
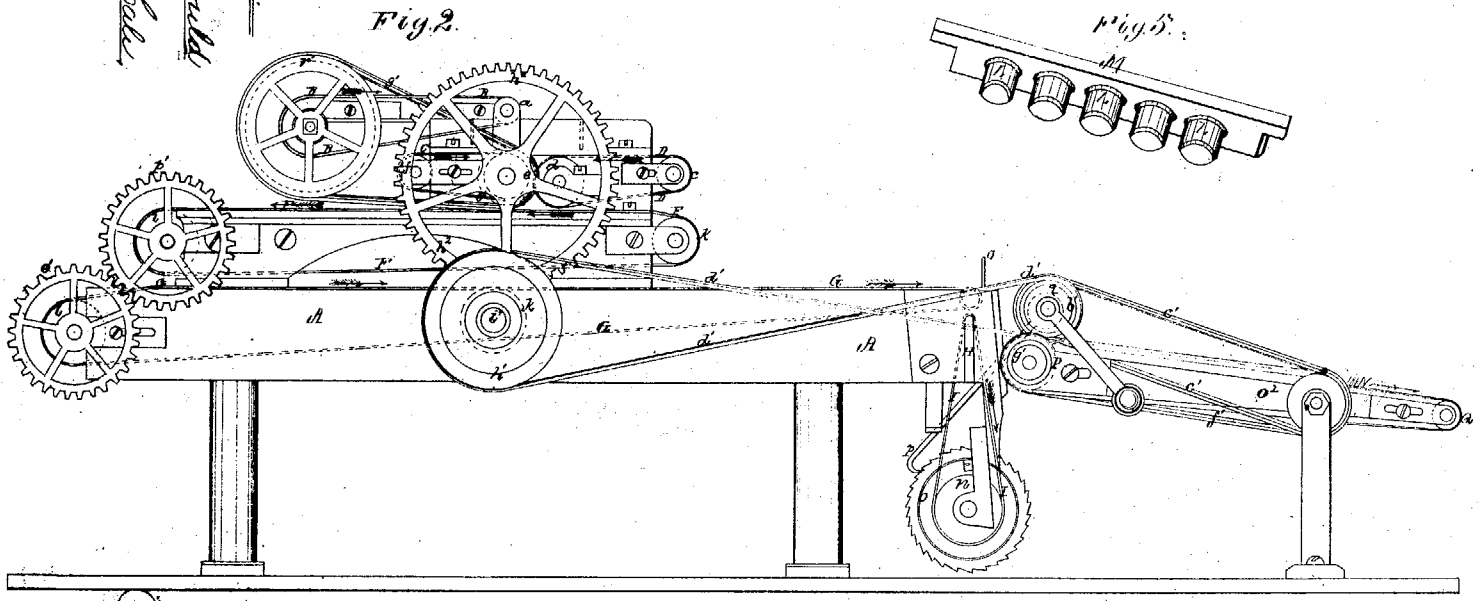
Witnesses.
Saml. Gould
F. G. Hale
Oliver Rice Chase
by his attorney.
F. P. Hale 4 Sheets--Sheet 3.
OLIVER RICE CHASE.
Improvement in Machine for Manufacturing Lozenges.
No. 4,634. Reissued Nov. 14, 1871.
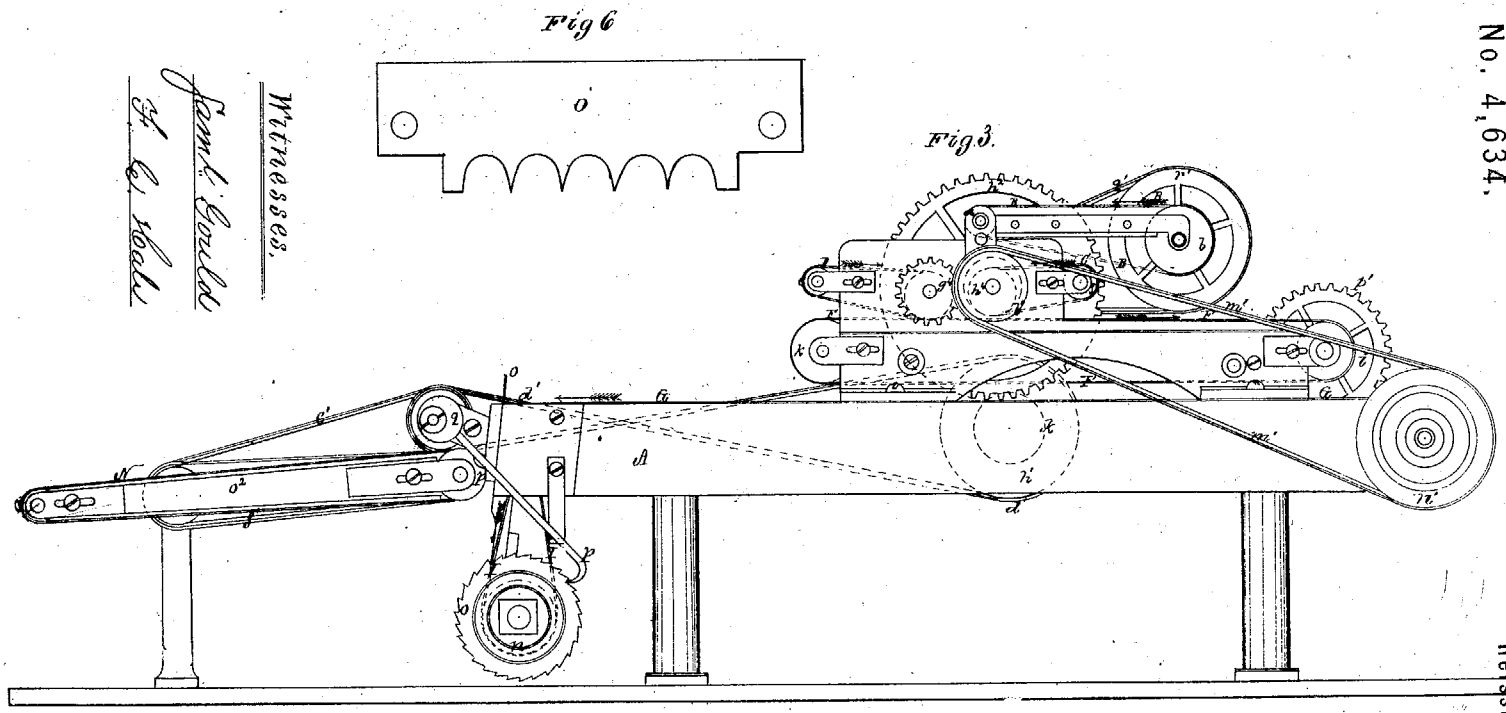
Witnesses.
Saml. Gould
F. G. Hale
Oliver Rice Chase.
by his attorney.
F. P. Hale 4 Sheets--Sheet 4.
OLIVER RICE CHASE.
Improvement in Machine for Manufacturing Lozenges.
No. 4,634. Reissued Nov. 14, 1871.
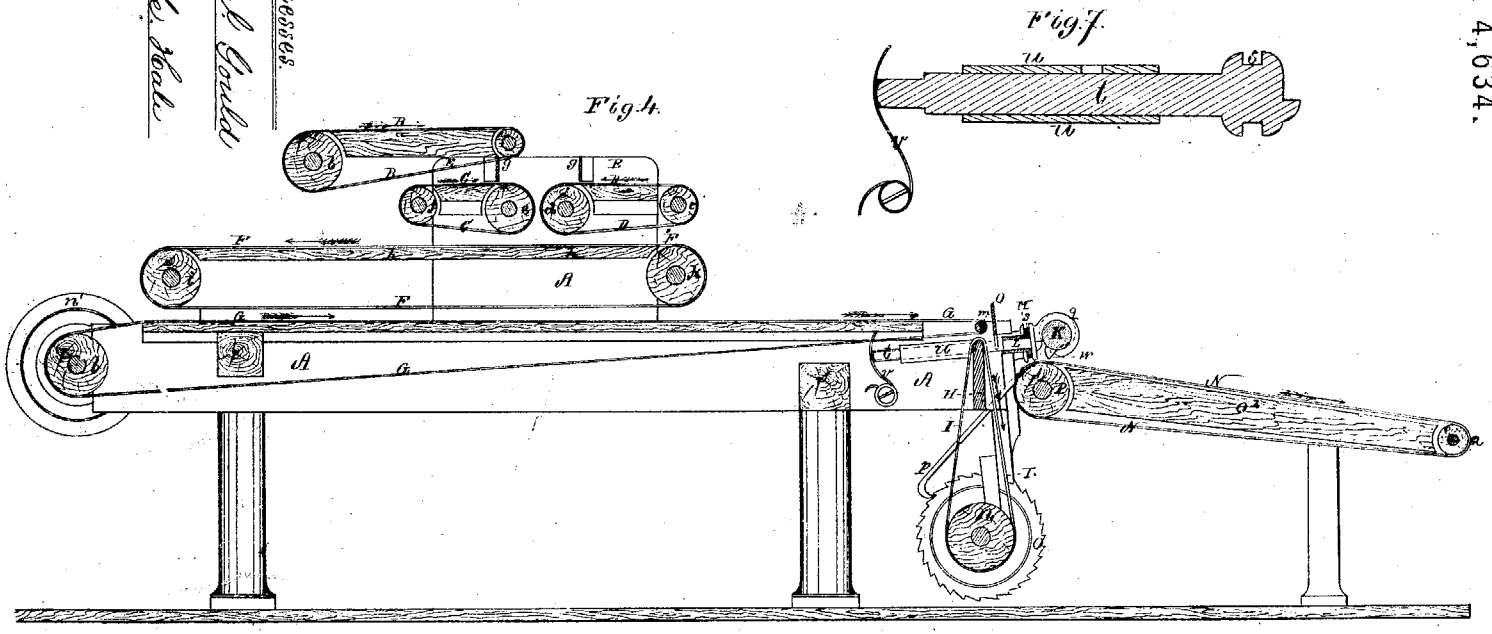
Witnesses.
Saml. Gould
F. L. Hale
Oliver Rice Chase.
by his attorney.
F. P. Hale.

UNITED STATES PATENT OFFICE.

OLIVER RICE CHASE, OF BOSTON, MASSACHUSETTS, ASSIGNOR TO CHASE & CO.

IMPROVEMENT IN MACHINES FOR THE MANUFACTURE OF LOZENGES.

Specification forming part of Letters Patent No. 39,196, dated July 7, 1863; reissue No. 4,634, dated November 14, 1871.

*To all whom it may concern:*

Be it known that I, OLIVER RICE CHASE, of Boston, in the county of Suffolk and State of Massachusetts, have invented an Improved Machine for Manufacturing Lozenges or other articles from paste or dough; and I do hereby declare that the same is fully described in the following specification and represented in the accompanying drawing, of which—

Figure 1 is a top view; Figs. 2 and 3, side elevations; Fig. 4, a central and longitudinal section of such machine; Fig. 5 is a perspective view of its cutters and their carrying-bar; Fig. 6, an elevation of the comb-plate which operates in connection with the cutters. Fig. 7 is a longitudinal section of one of the supporters of the cutter-carrier, such section being made to exhibit the spring and the socket of the supporter.

The nature of my invention or improvements consist in a combination and arrangement of an extra delivery-apron with the main delivery-apron, the paste-receiving and sugaring apparatus, and mechanism for stamping out or cutting the lozenges from the paste; the object of the said extra delivery-apron, when used as hereinafter set forth with the main delivery-apron and the apparatus for reducing the paste and sugaring it on both sides, being to enable the sheet of paste to be seen on both of its sides or flat surfaces preparatory to its being subjected to the action of the cutters. Also, in an arrangement and combination of the delivery-apron, the cutter-board, and cutters with a lozenge-receiver or a discharging-apron, the same not only enabling the sheet of paste to drop vertically and fall by its own weight preparatory to and after being cut, but causing the cutters to discharge the lozenges in manner set forth into a receiver, or on the discharging-apron or boards placed thereon. Also, in a combination and arrangement of a surface-changing apron, the cutter-board, and the series of cutters, as and for the purpose hereinafter set forth. Also, in an arrangement and combination of a surface-changing apron with the cutter-board, the delivery-apron, the cutters, and the lozenge-receiver or discharging-apron, as hereinafter specified. Also, in an arrangement and combination of a comb-plate or its equivalent with the cutters and their cutter-board or device for supporting the paste or dough under the action of the cutters.

In the drawing, A exhibits the frame of the machine, on the upper part of which there is a supplying or feeding endless apron, B, and two other endless aprons, C D, the three aprons being disposed with respect to each other, and around drums or rollers *a b c d e f*, as shown in Figs. 1 and 4. The rollers *d* and *e*, while they serve to give support to two of the aprons, operate with such to reduce the paste to a sheet of equal thickness while it may be passing between them. Furthermore, directly over each of the aprons C D there is a gauge-bar or plate, *g*, which, being arranged so as to extend from side to side of the frame of the machine and at a short distance above the apron, gauges the thickness of sugar which, by the apron, may be carried into contact with the sheet of paste or dough formed between the said two aprons C D. While the machine is at work a mass of powdered sugar is placed in the sugar receptacle E, situated at the back of each gauge-plate *g*. Directly underneath the said aprons C D is an endless delivery-apron, F, working around a supporting-board, *h*, and two rollers, *i k*, which are disposed as shown in Fig. 4. This apron I term the extra delivery-apron. Furthermore, immediately below the apron F is disposed the main delivering-apron G, carried by two drums or rollers, *l m*. This latter apron is not only much longer than the apron F, but projects beyond both of the supporting rollers of the latter, as shown in the drawing, the same being not only so that the sheet of paste, after being discharged from the apron F, may fall upon or be received by the apron G, but that it may be carried by it so far beyond the front roller of the apron F as to be capable of being inspected or readily seen, polished and sugared in case its upper surface may need any more powdered sugar applied to any part of it preparatory to such part being carried in contact with the cutters. By means of the two delivery-aprons F and G all portions of both sides or opposite surfaces of the sheet of paste can be seen and examined before such portions may be made to pass across the cutter-boards.

The several arrows shown in the drawing serve to indicate the directions of movements of parts to which they are applied.

Below the front end of the delivery-apron G the cutter-board H is disposed with its face upright, or nearly so. A surface-changing endless apron, I, is disposed so as to pass entirely around and rest against the face of the cutter-board, as shown in Fig. 4, such apron being supported by the cutter-board and a drum, *n*. A ratchet-wheel, *o*, is fixed on the shaft of the roller *n*, and operated by a draw-pawl, *p*, whose upper part embraces an eccentric, *q*, carried by a cam-shaft, K, arranged as shown in the drawing, the object of such ratchet and pawl being to so move the said apron as to cause it to present a new or different surface to the action of the cutters at each successive forward movement of the latter. In front of the cutter-board H a series of tubular cutters, L L L, is arranged, so as to project from a supporting-bar, M, as shown in the drawing. Each tubular cutter extends through the bar M, and is open at its opposite ends in order that the lozenges received into the cutter at one end may be discharged at its other end and caused, by their own gravity, to fall into a receiver, or upon an endless carrier or delivery-apron, N, arranged around a platform, $o^2$, and two sustaining rollers, P Q, as shown in Fig. 4. Each end of the cutter-bar M rests in a recess or socket, *s*, formed in the head of one of two slide-rods or sliders, *t t*, each of which is supported in a tubular socket or bearing, *w'*, and so as to be capable of sliding in a direction longitudinally of the machine. A spring, *v*, is so disposed as to act against the rear end of the slider in manner to press such slider toward the cam-shaft K. Such shaft K is furnished with cams *w w*, which, during each revolution of the shaft, are caused to act against the front ends of the sliders so as to move the sliders rearward and cause them to force the cutters into the paste and against the apron around the cutter-board. The shaft K may be considered as the driving-shaft of the machine. It carries two grooved pulleys, *a' b'*, around which, respectively, two endless bands, *c' d'*, are made to work. One of the said bands, or the foremost one *c'*, runs around a leading pulley, about which another endless band, *f'*, works, and transfers motion to a pulley, $g^1$, fixed upon the shaft of the rearmost drum of the foremost or discharging-apron N, the same serving to put such apron in movement. A crossed belt, *d'*, also extends about a pulley, $h^1$, fixed upon a shaft, *z*, that carries a pinion, *k'*, which engages with a gear, $h^2$, fixed on the shaft of the compressing-roller *e*, and as the two compressing-rollers *d e* are geared together by gears $g^4$ $h^4$, arranged as shown in Figs. 1 and 3, they, with their endless or sugaring-aprons C D, receive motion when the shaft K is put in rotation. Furthermore, by means of a pulley, *l'*, fixed on the shaft of the rearmost compressing-roller *e*, motion is, at the same time, imparted to an endless band, *m'*, that traverses about a pulley, *n'*, fixed on the shaft of the rearmost drum *l* of the main delivery-apron G. By such means the main delivering-apron G will be put in operation. The shaft of the rearmost drum or roller carries a gear, $o^1$, that engages with a gear, *p'*, fixed on the shaft of the rearmost drum of the extra delivery-apron F, such apron being made to receive motion by means of such devices. The uppermost or feeding-apron B is moved by means of an endless belt, *q'*, which traverses around two pulleys, *r' s'*, one of which is fixed on the shaft of the rearmost compressing-roller *e*, while the other is carried by the shaft of the rearmost drum *b* of the feeding-apron. Between the cutters L and the cutter-board H there is a perforated plate or comb, *o*. This comb has its teeth projecting down, so as to pass between the cutters; or it may be a plate constructed with holes of the same shape and size in cross section of the said cutters. The purpose of this plate or comb is to hold back the scraps of paste during the retreat of the cutters from the cutter-board. Owing to the peculiar arrangement or position of the said comb *o* the cutter-board and its surface-changing apron the scraps will be caused to pass downward and be discharged from the machine by the power of gravity, and besides, after each cutter may have become filled with the lozenges, each succeeding lozenge that may be received in it will force those in advance of it forward and cause the outermost one of them to drop out of the rear end of the cutter and into the receiver or upon the endless delivering-apron N, immediately under the same.

During the operation of the machine the paste will be prepared or reduced to a proper thickness and sugared on both sides, and will hang down upon the front face of the apron of the cutter-board. While it is in such position the cutters, which may be of such shape and size in cross-section as may be desirable, are forced through it by the operations of the cams of the shaft K, the recession of the cutters being effected by the springs applied to their sliders, hereinbefore described. The lozenges fall out of the rear ends of the cutters and into a receiver, or upon the surface of the discharging-apron, or upon boards or trays laid thereon.

Having thus described my improved machine for making lozenges, as well as the mode of its operation, I will remark that, in comparison with most other machines for such purpose, it possesses some eminent advantages both as to simplicity of construction and to the manner in which it operates, and affords sight of the paste preparatory to its being cut into lozenges and discharged from the machine.

What I claim as my invention in such machine is as follows:

1. The combination of the extra delivering-apron F with the main delivering-apron G, the sugaring and reducing apparatus, and mechanism for stamping out or cutting the lozenges from the paste, substantially as and for the purpose hereinbefore set forth.

2. The combination of the delivering-apron G, the cutter-board H, and the series of cutters L, substantially as and for the purpose hereinbefore set forth.

3. The combination of the delivering-apron G, the cutter-board H, the series of cutters L, and the discharging-apron N, substantially as and for the purpose hereinbefore set forth.

4. The combination of the surface-changing apron I, the cutter-board H, and the series of cutters L, substantially as and for the purpose hereinbefore set forth.

5. The combination of the delivering-apron G and a receiver or discharging-apron N with the surface-changing apron I, the cutter-board H, and the series of cutters L, substantially as and for the purpose hereinbefore set forth.

6. The combination of the comb-plate O with the cutters L, and the cutter-board or device for supporting the paste while being acted on by the cutters, substantially as and for the purpose hereinbefore set forth.

OLIVER R. CHASE.

Witnesses:
J. D. HALE,
F. C. HALE.

(155)